US009184603B2

(12) United States Patent
Lee

(10) Patent No.: US 9,184,603 B2
(45) Date of Patent: Nov. 10, 2015

(54) MULTI-CHEMISTRY BATTERY CHARGING SYSTEM AND METHOD OF IDENTIFYING AND IMPROVED CHARGING TECHNIQUE FOR PRIMARY AND SECONDARY DRY-CELL BATTERIES

(76) Inventor: Wilson Lee, Camberwell (AU)

( * ) Notice: Subject to any disclaimer, the term of this patent is extended or adjusted under 35 U.S.C. 154(b) by 995 days.

(21) Appl. No.: 13/121,496

(22) PCT Filed: Sep. 29, 2009

(86) PCT No.: PCT/AU2009/001286
§ 371 (c)(1),
(2), (4) Date: Mar. 29, 2011

(87) PCT Pub. No.: WO2010/034079
PCT Pub. Date: Apr. 1, 2010

(65) Prior Publication Data
US 2011/0181242 A1    Jul. 28, 2011

(30) Foreign Application Priority Data

Sep. 29, 2008   (AU) ................................ 2008905047

(51) Int. Cl.
*H02J 7/00*   (2006.01)
(52) U.S. Cl.
CPC ............. *H02J 7/0003* (2013.01); *H02J 7/0045* (2013.01)
(58) Field of Classification Search
CPC .................................................... H02J 7/0045
USPC ......................... 320/110, 106, 113, 125, 162; 429/99–100
See application file for complete search history.

(56) References Cited

U.S. PATENT DOCUMENTS

| 5,187,422 | A | * | 2/1993 | Izenbaard et al. | ............. 320/110 |
| 5,291,116 | A | * | 3/1994 | Feldstein | ..................... 320/119 |
| 5,543,702 | A | * | 8/1996 | Pfeiffer | ....................... 320/110 |
| 5,565,756 | A | * | 10/1996 | Urbish et al. | ................. 320/103 |
| 5,729,115 | A | * | 3/1998 | Wakefield | ..................... 320/110 |
| 6,204,632 | B1 | * | 3/2001 | Nierescher et al. | ........... 320/116 |
| 7,262,580 | B2 | * | 8/2007 | Meyer et al. | .................. 320/110 |
| 2002/0063550 | A1 | * | 5/2002 | Chen et al. | .................... 320/110 |

FOREIGN PATENT DOCUMENTS

WO    WO 2008/125790 A1    10/2008

OTHER PUBLICATIONS

The international search report for PCT Application PCT/AU2009/001286 mailed Jan. 22, 2010.

* cited by examiner

*Primary Examiner* — Yalkew Fantu

(57) ABSTRACT

A microprocessor controlled multi chemistry battery charging system and method for recharging primary and secondary batteries are disclosed. The charger has multiple battery holder bays with different recess levels to accept up to four batteries of different sizes and different chemistry types particularly Primary Alkaline, Primary Titanium, Rechargeable Alkaline Manganese (RAM), NiCd and NiMH batteries. The microprocessor controlled electronic circuit automatically identifies the type of battery to be charged by monitoring and comparing voltage responses over preset time by supplying constant charging current. Depending upon the type of battery, the charger controls suitable charging current or current pulses at different frequencies till battery voltage reaches preset maximum reference voltage or battery voltage remains relatively constant below preset maximum reference voltage over preset time period. The charger has built in safety protections, battery tester function, audio visual arrangements to display status, a variable DC output port and USB ports.

14 Claims, 6 Drawing Sheets

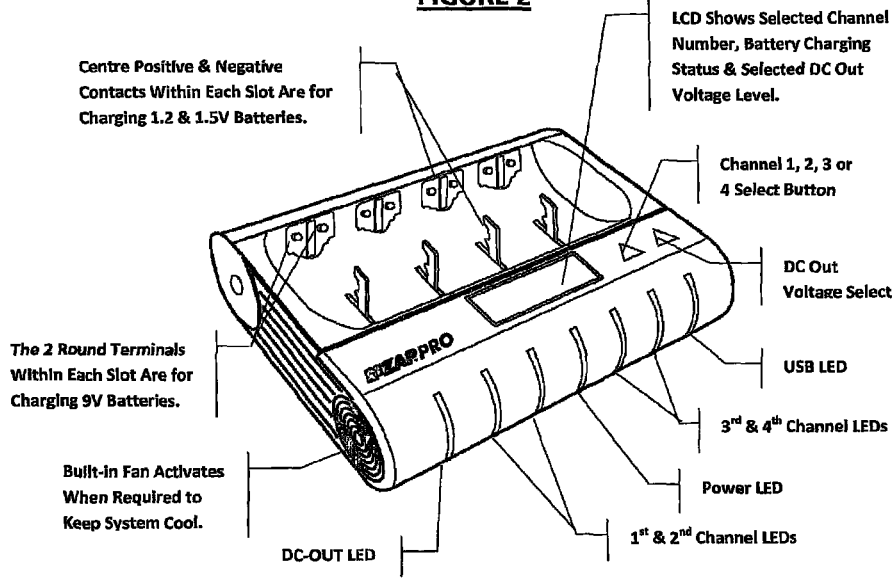
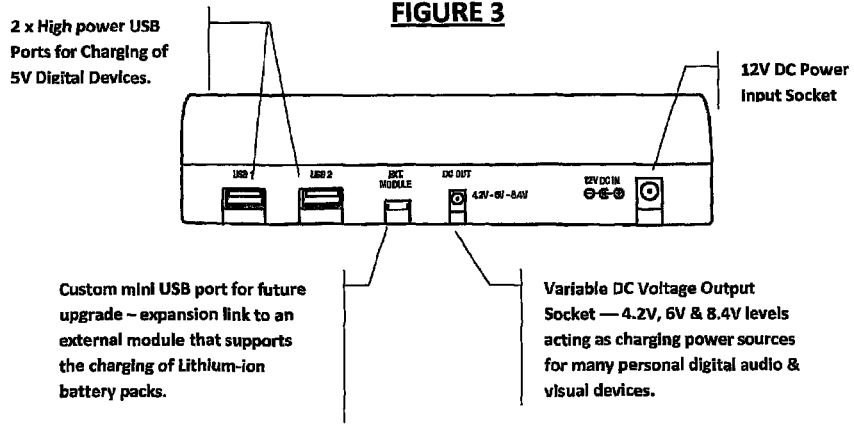

FIGURE 4

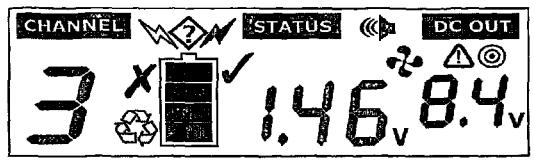

- Graphical illustration of battery cell being charged.

- Battery is being analysed.

- Standard charging for sensitive batteries.

- Fast charging when applicable.

- Battery is charged and ready for use.

- Sensitive battery has been *rezapped* and ready for use.

- Battery is bad and or no longer *rezappable*. Prompt disposal is required to avoid eventual battery leakage.

- Fan is ON to cool down the internal circuitry when required. When FLASHING, fan is not working and for safety reason, charger only operates in standard charge mode. When all batteries are removed from the charger, fan will be switched off automatically.

- Variable DC-Out port is ON.

CAUTION - Care is required when making DC-Out voltage selection as over-voltage may lead to damage of equipment being powered. ALWAYS select voltage first and then plug in device.

- Select 4.2V – to power devices accepting 3.0V – 4.5V input.
- Select 6V – to power devices accepting 5.0V – 6.5V input.
- Select 8.4V – to power devices accepting 7.0V – 9.0V input.

- Sound alert is only active when channel select is pressed. Alert sequences are as follows:1 short beep – Channel select returned to number 1 position. After 5. seconds delay with no further key pressed, charge status of the selected battery is alerted.

- No sound – selected channel has no battery.
- 2 short beeps – selected battery is being charged.
- 1 long beep – selected battery is charged and ready for use.
- 2 long beeps – selected battery is bad.

FIGURE 5

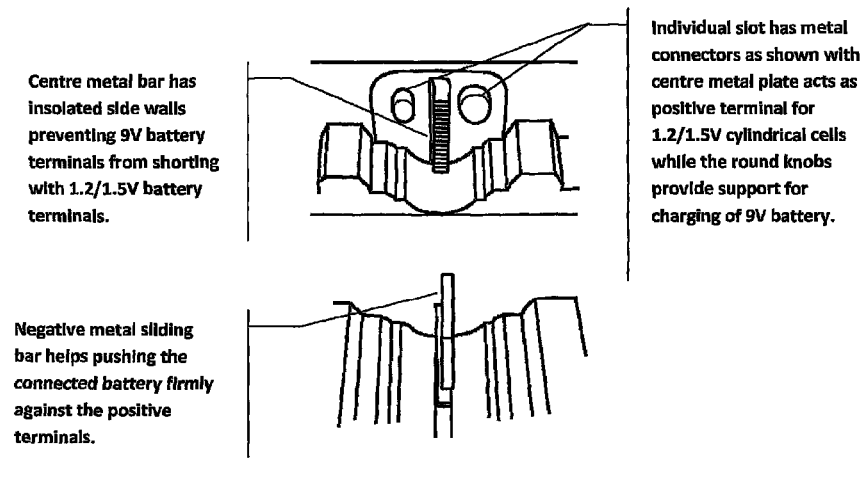

Centre metal bar has insolated side walls preventing 9V battery terminals from shorting with 1.2/1.5V battery terminals.

Individual slot has metal connectors as shown with centre metal plate acts as positive terminal for 1.2/1.5V cylindrical cells while the round knobs provide support for charging of 9V battery.

Negative metal sliding bar helps pushing the connected battery firmly against the positive terminals.

FIGURE 6

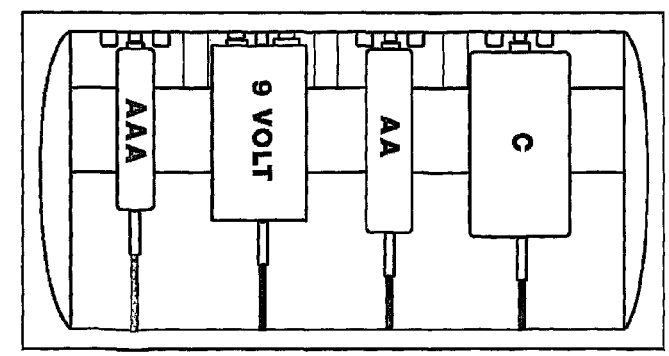

MULTI-CHEMISTRY BATTERY CHARGING SYSTEM AND METHOD OF IDENTIFYING AND IMPROVED CHARGING TECHNIQUE FOR PRIMARY AND SECONDARY DRY-CELL BATTERIES

FIELD OF THE INVENTION

This invention relates to charging of batteries. It relates to primary batteries which are generally considered non-rechargeable and secondary rechargeable batteries. It particularly relates to the multitude of different batteries for a multitude of different electric and electronic devices.

BACKGROUND

As society is becoming increasingly mobile, we see the rapid adoption of mobile phones, laptop computers, palm devices, personal stereos, remote controllers and as any parent knows, a huge array of electronic toys. Batteries are the power source of necessity for these devices which have become an everyday part of life whether at work, at home and at play.

The prior art illustrates a strong lack of options delivering efficiency and effectiveness and fails to provide a convenient and cost effective solution. Currently, the consumer is expected to merely purchase a new battery every time a battery goes out.

Many people take up rechargeable batteries so that the batteries can be recharged and reused over and over again. The disadvantages of rechargeable batteries are that they cost much more than primary batteries and replacing the whole house with a rechargeable system would be out of the question for most people. Further, rechargeable batteries lose their effectiveness and, in particular, their period of time 'in use' decreases and they are therefore required to be charged more frequently over time.

In addition, rechargeable batteries are rendered unsuitable for many electronic applications as rechargeable batteries have a very fast self discharge rate compared to primary alkaline batteries.

Further, a recharging battery requires a complicated battery charger which adds further cost to the consumer and can be quite difficult or complicated to operate. In addition, when the battery goes flat recharging requires an external power source, such as a power outlet. When the battery is not charged effectively, it is cumbersome and impractical to locate a power source when mobile or in transit.

There is a complex number and variety of battery types available on the market that includes rechargeable nickel cadmium and nickel metal hydride batteries as well as primary carbon zinc, alkaline and rechargeable alkaline batteries. Adding further to the complexity and confusion of rechargeable and non-rechargeable batteries are new alkaline variants called Titanium and long lasting advanced formula batteries and so forth that truly making recharging batteries a mine field for many people.

For one reason or the other, primary alkaline batteries still remain a part of our everyday life. They are readily available everywhere and their toxic wastes continue to threaten landfills and waterways. Many attempts have been made to come up with systems that can recharge primary alkaline as well as rechargeable batteries to help save money and the environment. Up until now, all recharger systems available are at their infancy stage and suffer from a wide range of short comings that made them unreliable and/or unsafe to use. Clearly there is a need to come up with a multi-chemistry battery recharging system that can overcome most if not all of the shortcomings known that are reliable and safe for consumer use.

Several prior art disclosures suggest different means for discriminating between primary and secondary batteries. One method disclosed the measurement and use of internal battery resistances to distinguish between primary alkaline and secondary NiCd batteries as outlined in U.S. Pat. No. 5,600,224. However this method is not reliable as consumer batteries are becoming complicated in recent time with more battery types added to the list such as the addition of the new breed of advanced formula alkaline batteries with very low internal resistances and the environmentally, more friendlier, NiMH and rechargeable alkaline batteries which make the distinguishing line not so apparent. Furthermore as batteries age, their internal resistances become higher and the values overlap one another which make this distinguishing task using internal resistances even more unreliable.

The most commonly seen method employed in chargers, charge only batteries having a certain predetermined feature. These however are not entirely satisfactory from the combined standpoints of safety, ease of use and more importantly these do not meet the criteria to be considered as universal recharging system that accepts most chemistry types of batteries.

Also, commonly seen approaches use mechanical or electronic switch selections as a means to distinguish the two battery types and thereafter apply a low charge current to primary alkaline batteries and moderate charge current to rechargeable batteries. These systems rely on the users to make complicated and often confusing selections that could lead to wrong operating settings either through plain human errors or technical ignorance. The consequences of such errors would cause adverse battery leakage, damage to batteries and chargers and, in worst cases, lead to dangerous battery explosions. Another short coming using this approach is that the system cannot charge different mix of batteries simultaneously. This type of chargers usually only can charge single battery type at a time.

Further, in practice there is the use of a common low charge current safely recharging both types of batteries so they can co-exist within a single charging system. This is the closest system that can overcome many problems encountered previously and is safe to use. However there are shortcomings with this technique as well as it taking at least 15 hours or more to charge up primary alkaline and rechargeable batteries. Even with the lengthy charge time, this system still cannot fully charge up many high capacity rechargeable NiMH batteries.

So there is a need to come up with a more efficient and effective method to automatically detect and distinguish primary and secondary dry-cell batteries without any involvement of the error-prone user interaction described above. There is also a further need for a faster and improved charging method that can properly recharge most different battery types within a single system.

The present invention attempts to overcome or at least ameliorate one or more of the problems of the prior art and to achieve or at least progress towards achieving one or more of the following objects of the invention.

It is therefore an object of the present invention to provide a charger that is capable of identifying primary non-rechargeable and secondary rechargeable dry-cell batteries.

It is another object of the present invention to provide a charger that is capable of safely recharging the widest range of different consumer battery types that belong to both groups of primary and secondary dry-cell batteries simultaneously.

It is yet another object of the present invention to provide a charger that can accommodate several different sizes, namely AAA, AA, C, D, Prismatic or gum-stick, 9V and N-sized batteries. The same charger can also further be expanded to include extra facilities to power a range of otherwise unpowered devices or charge up different battery packs in many self-powered devices.

It is still yet another object of the present invention to provide a charger that is very easy to use and requires little or no battery knowledge from the user.

It is also another object of the present invention to provide a charger that can deliver different rates of fast and slow charging to the batteries with multiple charge termination schemes and multiple safety protection capabilities.

It is also yet another object of the present invention to provide a charger that shows detailed information of the battery conditions and charging status that are easily understood.

SUMMARY OF THE INVENTION

According to the invention there is provided multi-chemistry battery charging system and method of identifying and improved charging technique for primary and secondary dry-cell batteries. The system provides a battery charger constructed to accept a variety of different sizes and different chemistry types of single dry-cell batteries. It is microprocessor controlled and has electronic circuitry that can identify the different primary and secondary batteries inserted into the charger and applies the appropriate prefer charge current and voltage to safely and properly charge up the batteries.

The said battery charger is built to have multiple battery holder bays that have different recess levels and sliding spring mechanisms that can secure different sized cylindrical dry-cell and prismatic sized batteries between the positive and negative charging terminals of the charger. Each battery holder bay also has a contact means that can couple with the two terminals of a 9V battery and together with the sliding spring contact which pushes at the base of the said 9V battery and secure it in place to receive the charging power.

The electronic circuitry within the charger is substantially controlled by means of a single or multiple microprocessors capable of controlling and varying the supplies of the charging current and voltage sources applied to batteries appropriately. The switching circuits create charge current pulses at different frequencies to achieve the desired effects of slow, medium or fast charge rates suitable for recharging of multi-chemistry battery types within the same system. The said circuitry has multiple sub-circuits known as "channels" layout in a serial or parallel arrangement that function in unison yet independently.

The charger can be designed to accept DC and or AC power and at power on, the system would perform a series of self tests and initialization routines to ensure the whole system is functioning correctly and send out appropriate audio and or visual signals to inform the user of its status. The circuitry concerned then constantly sends out electrical signals to all the charging terminals to sense for the presence of batteries across all available battery bays.

Upon a battery being detected that it is to be connected to the charger, the system firstly measures the initial voltage of the battery and compares it with a preset range of values and decides if the battery is a new or fully charged primary alkaline battery. If it is, then the system would promptly indicate the battery is fully charged and stop any further processing of the said battery. If the required condition is not met, then the system would apply a relatively constant test current of the order between 300 to 500 mA to the battery for a preset period and monitors the rate of voltage change of the said battery. This is the crucial criteria for identifying primary and secondary batteries.

Under this high current testing condition, the voltage responses of most primary cells including a large percentage of rechargeable alkaline batteries (though called "rechargeable" alkaline, these have similar voltage rating of 1.5V as that of primary alkaline and their charging behaviour considered the same which cuts off at 1.7V full charged voltage level) and some old NiCd batteries (though NiCd is classified as secondary battery type, it behaves similar to that of primary alkaline battery where its full charged voltage can go up to 1.7V and can accept slow to moderate charge current similar to alkaline batteries) would quickly rise and meet a certain preset voltage level which distinguishing themselves as primary alkaline batteries.

These batteries would then be charged using an appropriate low to moderate charge current suitable for recharging of primary alkaline batteries until their preset full charged voltage is reached at a preferred 1.7V level. The appropriate channels would then be switched off from further processing and suitable audio and or visual signals generated to inform the user of the battery 'fully charged' status. Those voltage responses that overshoot the preset abnormal voltage range would render the batteries as faulty and/or no longer rechargeable. The appropriate channels would then be switched off from further processing and suitable audio and or visual signals generated to inform the user of the 'battery bad' status.

On the other hand, secondary rechargeable NiMH and NiCD batteries together with a certain percentage of alkaline and rechargeable alkaline batteries would have their voltage responses rise relatively slower than that to the condition described earlier. These batteries, regardless of their battery types, have in common very low internal resistances and are capable of accepting fast and safe pulse or constant charging current ranges between 300 m to 500 mA.

Under this fast charging rate, rechargeable NiMH batteries' voltage responses would rise slowly to a preset full charged voltage range of 1.40 to 1.46V over time which varies depending on the capacity of the batteries under charge. The battery voltage would then stay relatively constant at the above voltage range over a preset period of time. When this condition is met it signals a full charged status for NIMH batteries and no further processing to the batteries are required. With the same fast charge condition, low-internal-resistance primary alkaline and rechargeable alkaline batteries as well as NiCd's voltage responses would rise much faster than those of NiMH described earlier and overshoot the NiMH full charged voltage range of 1.40 to 1.45V and continue to rise further.

Once this limit is passed, the system would switch the appropriate channels to a slow to moderate charge current suitable for charging alkaline batteries and the charging process continues until the full charge 1.7V limit is reached.

During the whole charging process of all battery types, the controlling microprocessor(s) would sense and measure all battery voltage changes in one second increment steps and monitor for any abnormal charge responses and or charge termination criteria to occur so that the charging process can be terminated promptly and all battery types are appropriately charged. A combination of multiple charge termination and protection schemes are employed to ensure the highest safety level can be achieved that includes:

Alkaline battery charge-safe protection,
Faulty battery detection & rejection,
Overcharge protection, Short circuit protection,
Wrong polarity Protection,
Negative delta voltage protection,
Zero delta voltage protection,
Timer Protection,
Temperature protection via built-in cooling fan,
Cooling fan failsafe protection.

It can be seen that the invention provides a device which represents the latest and most advanced battery charger yet. It employs state-of-the-art; multi-chemistry battery charging technology and innovative active charge monitor technique to ensure each battery is individually custom charged. REZAP® PRO is an all-in-one, next generation battery charger that satisfies all the complex battery needs of modern family homes. It charges all rechargeable batteries. Its new open architecture design ensures it can support a widest possible range of current and future digital devices. It also allows the user to RECYCLE non-rechargeable alkaline batteries at home and at work. It's safe, it's easy to use, it saves money and helps the environment.

BRIEF DESCRIPTION OF THE DRAWINGS

In order that the invention is more readily understood an embodiment will be described by way of illustration only with reference to the drawings wherein:

FIG. 2 is an illustrative front view of a multi chemistry battery charging system in accordance with a first embodiment of the invention;

FIG. 3 is an illustrative rear view of the multi chemistry battery charging system of FIG. 2;

FIG. 4 is an illustrative operative front display panel on top of the multi chemistry battery charging system of FIG. 2;

FIGS. 5 and 6 are illustrative views of the mounting of various sized batteries in the multi chemistry battery charging system of FIG. 2;

A PREFERRED EMBODIMENT OF THE INVENTION

Battery Types Guide

Figure 1:
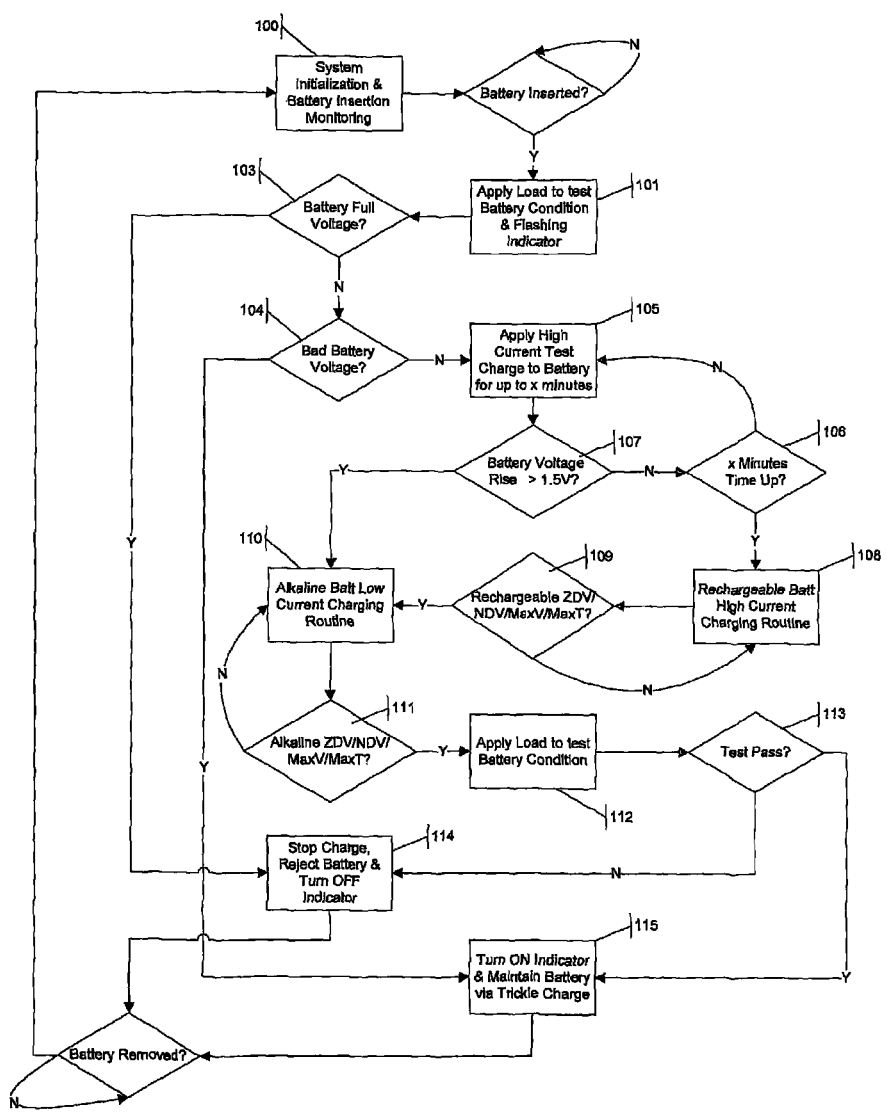
FIG. 1 is a flow diagram of the usage of a multi chemistry battery charging system in accordance with an embodiment of the invention.
Figure 7:
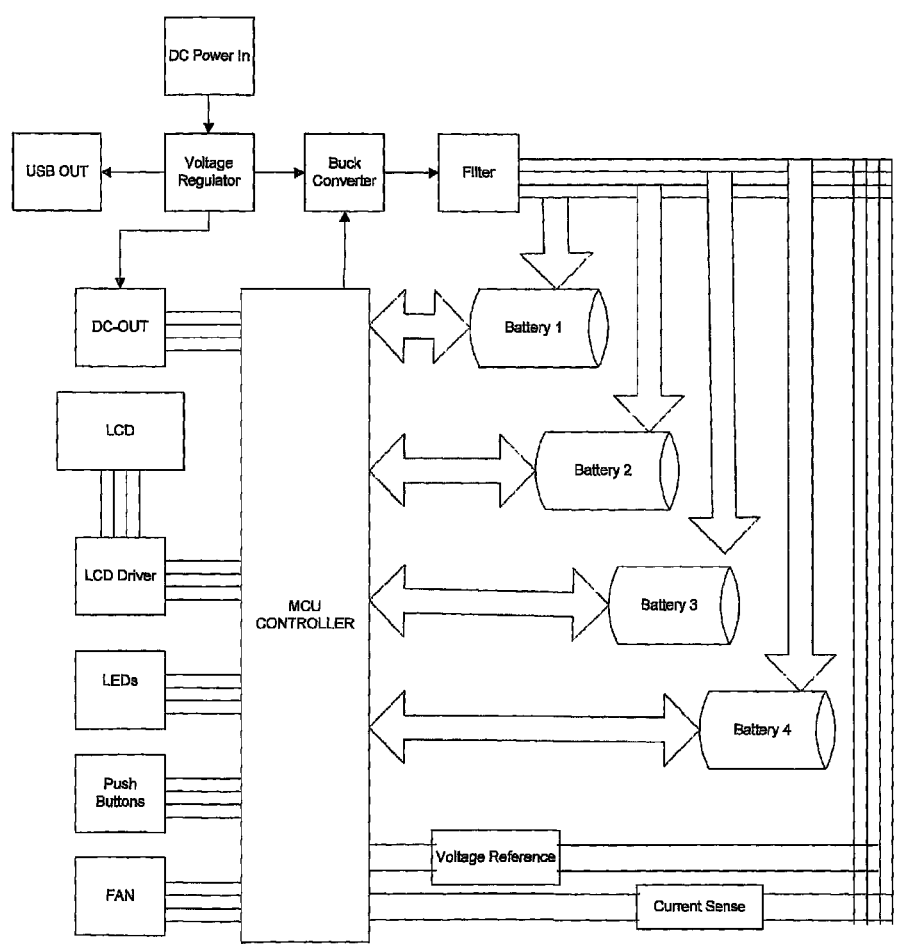
FIG. 7 is a diagrammatic view of interconnection of operative parts of the multi chemistry battery charging system of FIG. 2.
Figure 8:
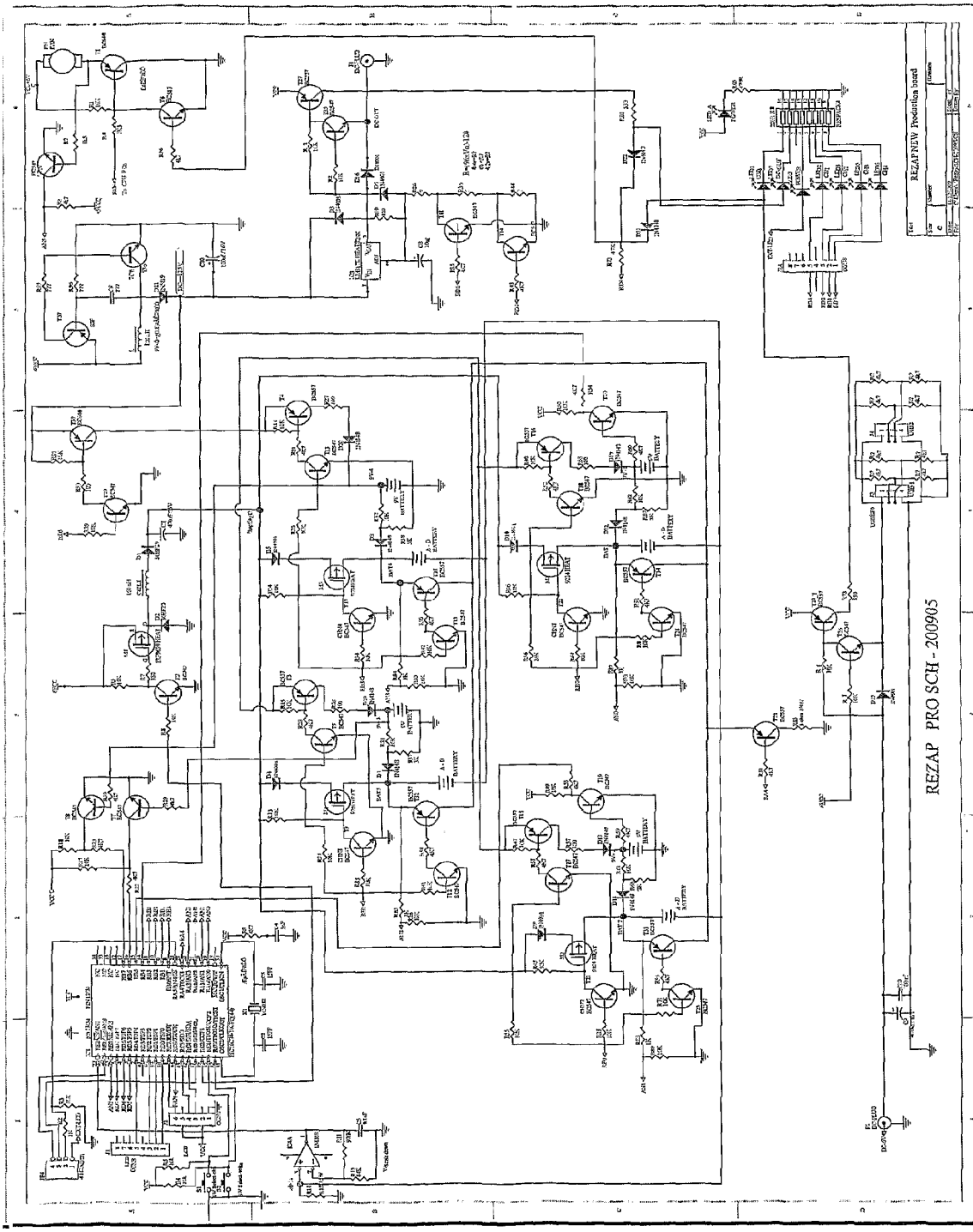
FIG. 8 is a detailed schematic Circuit Diagram of the multi chemistry battery charging system of FIG. 2.

There are two main groups of batteries, primary (non-rechargeable) and secondary (rechargeable). The table below shows some of their most common features and properties:

TABLE 1

Domestic Battery types with some of their common properties.

| TYPICAL FEATURES | COMMONLY USED DOMESTIC BATTERIES | | | | | | |
|---|---|---|---|---|---|---|---|
| | Carbon | Alkaline | Titanium | RAM | NiCd | NiMH | Lithium |
| Battery Labelling | Carbon Zinc, Heavy Duty, General purpose | Alkaline | Titanium | Rechargeabke Alkaline Manganese | Nickel Cadmium NiCd | Nickel Metal Hydride NiMH | Lithium Li |
| Battery Class | Primary | Primary | Primary | Secondary | Secondary | Secondary | Primary |
| Nominal Voltage | 1.5 V | 1.5 V | 1.5 V | 1.5 V | 1.2 V | 1.2 V | 1.5 V, 3 V, 6 V |
| Available Sizes | | | | AAA, AA, C, D, 9V, Prismatic (gum-stick) | | | |
| Cost Factor | $ | $$ | $$$ | $$$ | $$$ | $$$$ | $$$$$ |
| Suffer from Memory Effect problem? | No | No | No | No | Yes | No | No |
| Suitable for use with devices of "Usage-frequency" | Occassional | | | Moderate | | Frequent | |
| Suitable for use with devices of "Drain Rate" | Low Drain Examples: Remote controls & Torches . . . | | | Moderate to High Drain Examples: General light-duty electronic devices, Motorised toys Radios and MP3 players . . . (This group of batteries are not suitable for use with applications as listed under the "High Drain" column. | | High Drain Examples: Digital Cameras, Discman, Walkman, Heavy-duty motorised devices (Also support most applications as listed under Alkaline batteries). | |
| Supported By REZAP ® RBC889 | No | Yes | Yes | Yes | Yes | Yes | No |
| Standard Cycle Life | 1 | 1 | 1 | Up to 25 | Up to 600 | Up to 500 | 1 |
| Cycle Life under REZAP ® RBC889 | Not Supported | Up to 15 | Up to 15 | Up to 30 | Up to 1000 | Up to 1000 | Not Supported |

The following describes the method of the multi chemistry battery charging system and method of identifying and improved charging technique for primary and secondary dry cell batteries.

Step 1: Turning the Charger On
  Plug the 12V switching power supply into a proper indoor electrical outlet and connect its output cable to the 12V input socket at the back of the charger. Switch on the power from the mains, the blue LED lights up indicating the charger is active and ready for use.

Step 2: Connecting the Batteries to the Charger
  The batteries are to be in good condition before charging them. Batteries with the following characteristics should not be charged: illustrating signs of rust, chemical leakage or deposit on the terminals. These should be disposed of immediately to avoid subsequent damage to the charger and/or electronic devices.
  Although battery leakage found on some faulty, damaged or old batteries will not typically cause immediate damage to unprotected is skin, it is best to avoid contact, or if contact occurs, immediately wash the exposed area with soap and water.

Place used batteries to be charged into the charger slots according to their different sizes as follows and ensure all batteries are connected correctly to the charger. Referring to FIG. 6 the user is to note the battery polarities.

AAA, AA, C, D and 9V batteries can be inserted into any of the four main slots.

When charging of "C" and "D" size high capacity batteries, the lid is designed to be left open with helps to cool the batteries being charge.

Step 3: Observing the Chargers Status.

LCD Indicators:
Refer to FIG. 4 for a full list of explanations of the essential indicators.

LED Indicators:
Refer to FIG. 2. Once batteries are firmly in contact with the chargers battery terminals, the charger's indicator lights will be activated, showing the different status as follows:

BLUE LIGHT ON—Power is ON and the charger is ready for use.
GREEN LIGHT FLASHING—Battery is being charged.
GREEN LIGHT ON—Charging is finished and battery is ready for use.
GREEN LIGHT OFF—No battery present or improper battery connection
GREEN LIGHT TURNS OFF AFTER FLASHING—Battery is faulty, exhausted and or is no longer rechargeable. Prompt dispose of these batteries to avoid eventual battery leakage.
RED LIGHT ON—USB or DC-OUT ports on active mode when there are devices connected to these ports on the charger.
RED LIGHT OFF—No Devices connected to the USB or DC-OUT ports.

Step 4: Interaction with LCD Control Panel.

Refer to FIG. 2:
CHANNEL SELECT BUTTON—when pressed will move the focus point of the LCD screen from the left to the right channel in succession and the cycle repeats as follows:

↻ CHANNEL 1⇨ CHANNEL 2⇨ CHANNEL 3⇨ CHANNEL 4↺

FIG. 4 shows the LCD screen on CHANNEL 3. The selected channel shows the charging status and voltage conditions of the battery in it under the status heading.

DC-OUT SELECT BUTTON—when pressed the variable DC voltage output at the back of the charger changes from lowest to highest level in succession and the cycle repeats as follows:

↻ 4.2V⇨ 6V⇨ 8.4V↺

The selected DC voltage output is regulated at a set level to match the required power input setting of the appropriate digital device being powered or charged.

DC-OUT Charging Function

The REZAP® PRO is equipped with a variable voltage, DC-OUT socket at the back of the charger. This socket outputs three different preset regulated voltage levels of 4.2V, 6V and 8.4V which can be selected by the DC-OUT select button, located on the control panel. Linking via a 1-IN, 6-OUT multi-headed DC-OUT cable (described in details on page 5), allows the charger to power a range of otherwise unpowered devices or charge up different battery packs in many self-powered devices.

DC-OUT DEFAULT VOLTAGE:
By default, the DC-OUT setting is initialised at the lowest level of 4.2V when the charger is first powered ON.

VOLTAGE SELECTION:
Select 4.2V—to power devices accepting 3.0V-4.5V input.
Select 6V—to power devices accepting 5.0V-6.5V input.
Select 8.4V—to power devices accepting 7.0V-9.0V input.

Dual USB Charging Function

The REZAP® PRO is also equipped with two high powered USB ports located at the back of the unit. By using standard USB cables that come with many digital devices at time of their purchase, the charger can power a range of otherwise unpowered devices or charge up different battery packs in many 5-volt, self-powered devices.

Dynamic Battery Tester Function

The REZAP® PRO has a built-in dynamic battery tester function, which constantly monitors and measures the voltage conditions of all batteries being charged. This information is always there in the system and readily available on-demand and, at a touch of a button, will be displayed on the LCD screen.

Rechargeable and Alkaline batteries are rated at 1.2V and 1.5V respectively. FULL charge condition for NiCd and NiMH batteries only show a voltage reading between 1.34V to 1.44V whereas alkaline batteries show 1.5V or more.

Some exhausted and or faulty alkaline batteries often show a false voltage of up to 1.5V or higher when measured by means of a volt meter or the built-in tester function, however when these are put to use they quickly die out. These batteries are considered no longer useful and should also be disposed of straight away to avoid eventual battery leakage.

During the charging of alkaline batteries, the charging voltage can rise up to 1.8V or higher. This is quite normal and should not be alarmed. Once the charging process is finished, the battery voltage will stablise and drop down to a lower level.

The batteries that should be charged are: Alkaline, RAM (Rechargeable Alkaline Manganese), NiCd and NiMH batteries. Batteries that should not be charged are: Carbon Zinc (such as those with no battery type printed on them or those labelled as SUPER HEAVY DUTY or GENERAL PURPOSE) or primary Lithium batteries (such as those used in cameras, 3V or 6V and labelled—LITHIUM) in this charger (Refer to Table 1 for details of various different battery types and how to recognize them). These unsupported battery types will be rejected or not properly charged if put into the charger.

Charge alkaline cells before they go completely flat. If the cells are discharged beyond the point of return (less than 0.9V), chances are that they will not be revived properly. Most electronic devices cut off at the 0.9 volt level; however devices such as torches, radios, clocks, remote controls or the like do have the tendency to drain the batteries completely.

Alkaline cells should be disposed of promptly if they are rejected by the charger (green light turns off after flashing) or their service life is very short after recharged.

After batteries are charged, only batteries that show the same voltage strength should be used together. For alkaline batteries, use those with voltage strength above 1.44V together and for rechargeable batteries, use those with voltage strength above 1.30V together. Mixing weak or partially charged with fully charged batteries will result in your device not functioning properly or not powering on at all. Also remember not to mix different battery types together (eg: Alkaline with rechargeable).

For best results, charged alkaline cells should be promptly removed within a few hours after charging is completed. Continuous connection to the metal plates (whether the charger is ON or OFF) for a prolonged period will shorten battery life. Recharged alkaline cells should be used as soon as possible as they are not suitable for long term storage due to their rapid self discharge.

Different brands of alkaline cells may give different results, depending on the chemical composition used in making the batteries. Do not be surprised to find that some top brand alkaline cells may yield fewer cycle lives than less well-known brands. Try different brands of batteries and decide for yourself the brands that work best in your applications and in the REZAP® PRO charger.

The charger has four main slots with four corresponding green lights. Only put one battery per slot. Do not try to put one battery on top of another in a single slot.

9V alkaline batteries are not charged using "individual cell" technique due to their internal structure (multiple cells linked together in series to give a higher battery voltage). Any fault or weakness amongst the cells can result in the battery being poorly recharged or not useable at times. Do not hold high expectation on these batteries.

9V alkaline batteries when charged tend to expand slightly at their two ends. This is normal considering their outer case constructions are not made as strong as those of 9V rechargeable batteries.

Cycle life is based on the battery receiving proper care and also depends on the depth of discharge. In general, shallow discharges provide more cycles than deep discharges.

REZAP® PRO RBC-889 Specifications

| | |
|---|---|
| Microcontroller | Digital Works' state-of-the-art proprietary Multi-Chemistry battery charger's high performance 8-bit microprocessor, CMOS, fully static, employing advanced RISC architecture with integrated analogue-to-digital converters and multi-channel high speed input/output ports controlling the whole charging process in real time. |
| Input Voltages | DC 12 V, 2A Switching Power Adaptor (AC 100-240 V 50/60 Hz, 0.8A Max) for SAA, GS & BS Standards or UL, CUL & JIS Standards |
| Output Rating | DC 12 V, 2A max, 24 Watts max. |
| Supported Battery Sizes | 1 to 4 × AAA, AA, C, D & prismatic sizes (1.2 or 1.5 V)<br>1 to 4 × 9 V batteries |
| Supported Battery types | Alkaline, Titanium, RAM (Rechargeable Alkaline Manganese), NiCd and or NiMH batteries. (Do not attempt to charge battery type not specified.) |
| Supported Capacities | AA size-Up to 3,000 mAh<br>C & D size-Up to 8,000 mAh |
| Charging Time | 1 to 8 hours for Alkaline Batteries<br>1 to 16 hours for rechargeable batteries<br>Note: time variation depends on type, make, size and condition of battery. |
| Charging Currents | Fully Automatic |
| Built-In Input Output Ports | 2 × Standard USB ports for charging of various digital devices that accept USB power. Output current is regulated at 300 mA per port.<br>1 × DC-OUT (variable digital outputs of 4.2 V, 6 V and 8.4 V) for charging and or acts as power source for various digital devices such as digital cameras and digital video camcorders. Output current is regulated at 300 mA per port.<br>1 × Mini custom USB interface port for future upgrades and expansions. |
| Battery Tester Function | Built-in simulation of voltmeter, which measures the strength of each battery and displays the voltage level via LCD. |
| Protection Schemes employed | Alkaline battery charge-safe protection,<br>Faulty battery detection & rejection,<br>Overcharge protection,<br>Short circuit protection,<br>Wrong polarity protection,<br>Negative Delta Voltage protection,<br>Zero Delta Voltage protection,<br>Temperature protection via bullt-in cooling FAN,<br>Short and Open circuit protections on cooling FAN,<br>Timer protection. |
| Safety Compliance | AS/NZS 3108:1994; AS/NZS 3350.1:2000; AS/NZS 3350.2.29;2001<br>EN 206041A; EN 60335.1; EN 60335.2.29 & CE (EN50082-1)<br>EMC; C-Tick (AS/NZS 1044:1995) & FCC Part 15 Class B<br>UL 1310-Fourth Edition-Class 2 Power Units<br>CSA Standard C22.2 No. CAN/CSA-223-M91<br>CSA Informs-Power Supplies No. 3 |
| Net Weight | 0.43 Kg. |

KEY FEATURES OF THE INVENTION

Advanced microprocessor control for safe and user-friendly operation.

Supports most domestic-sized batteries including AAA, AA, C, D, 9V and Sony® prismatic 1.2V NIMH rechargeable (also known as gum-stick) size often used in Sony® Walkman, Discman or MD players.

Supports Alkaline, RAM (Rechargeable Alkaline Manganese), NiCd (Nickel Cadmium) and NiMH (Nickel Metal Hydride) batteries.

Automatic detection of different sizes and types of batteries.

Individual charging feature supports up to four mixed sizes and types of batteries simultaneously.

Supports charging of multiple 9V batteries (up to 4×9V batteries).

Extends 9V Alkaline battery life up to 5* times.

Extends 1.5V Alkaline battery lives up to 10* times.

Recharge RAM batteries up to 25* times.

Recharge NiCd and NiMH rechargeable batteries up to hundreds of times.

Overcharging protection prevents damage to batteries.

Built-in advanced LCD function showing battery charging status and dynamic voltage read-out of each battery under processing.

Built-in dynamic battery tester function measuring the strength of each battery and display its condition on the LCD screen.

Built-in sound alert for the visually impaired.

Built-in dual high power USB ports.

Built-in FAN for cooling of the internal charger's circuitry when required.

Built-in variable DC-OUT supporting the charging and or powering of many personal digital devices such as digital cameras, video camcorders, portable DVD players, personal media players, PDAs and more.

Support the charging of many popular portable handheld game consoles and MP3 devices such as Sony® PSP, Nintendo® GBA, NDS and NDS Lite and Apple® iPod via standard USB cables came with the consoles.

Support the charging of many popular mobile/cell phones such as Nokia®, Motorola®, Sony Ericsson® and more with the optional mobile connectors.

Charger can be operated from 12V/24V In-car power supplies via the optional Rezap® In-car cable kit.

Usage of detachable & universal world voltage (110-240V, 50/60 Hz) power supply suitable for travellers.

Cycle life depends strongly on factors such as brands, quality and conditions of batteries as well as rate of discharge, cut-off voltage and depth of discharge of batteries. Depth of discharge is defined as the level to which battery voltage is taken during discharge. Discharging to less than the recommended voltage is known as overdischarge. The shallower the discharge, the more cycles the battery will provide. This is true for all battery chemistries.

Safety Features

REZAP® PRO RBC889 has been designed to meet the highest safety standards. A combination of hardware and software controls has been employed to deliver the following multi protection schemes:

Alkaline battery charge-safe protection,
Faulty battery detection & rejection,
Overcharge protection,
Short circuit protection,
Wrong polarity Protection,
Negative delta voltage protection,
Zero delta voltage protection,
Timer Protection,
Temperature protection via built-in cooling fan,
Cooling fan failsafe protection.

It can therefore be seen that the Multi-chemistry battery charging system and method of identifying and improved charging technique for primary and secondary dry-cell batteries provides usage for a range of batteries.

The invention claimed is:

1. Multi-chemistry battery charging system of identifying and improving charging technique for primary and secondary dry-cell batteries such as Alkaline or Titanium, and Rechargeable Alkaline Manganese (RAM), NiCd or NiMH, the system including;
   a. a battery charger constructed to accept a variety of different sizes and different chemistry types of single dry-cell batteries,
   b. a microprocessor for controlling the battery charger and
   c. having electronic circuitry that can identify different primary and secondary batteries inserted into the charger and
   d. applying an inherently appropriate preferred charge current and voltage to safely and properly charge up the batteries;
   wherein switching circuits create charge current pulses at different frequencies to achieve the desired effects of slow, medium or fast charge rates suitable for recharging of the multi-chemistry primary and secondary dry-cell batteries within the same system.

2. Multi-chemistry battery charging system according to claim 1 wherein
   the said battery charger has multiple battery holder bays that have different recess levels and sliding spring mechanisms that can secure different sized cylindrical dry-cell and prismatic sized batteries between the positive and negative charging terminals of the charger such as size AAA, AA, C or D size batteries.

3. Multi-chemistry battery charging system according to claim 2 wherein
   a. each battery holder bay also has a contact means
      i. that can couple with the two terminals of a battery and together with a sliding spring contact which pushes at the base of the said battery and secures the battery in place to receive the charging power.

4. Multi-chemistry battery charging system according to claim 3
   a. wherein the electronic circuitry within the charger is substantially controlled by means of a single or multiple microprocessors capable of controlling and varying the supplies of the charging variable pulsing current and voltage sources applied concurrently or non-concurrently at fast medium or slow charging rates to differently identified multi-chemistry primary and secondary dry-cell batteries appropriately.

5. Multi-chemistry battery charging system according to claim 1
   a. wherein the switching circuits create charge current pulses at different frequencies to achieve the desired effects of slow, medium or fast charge rates suitable for recharging of multi-chemistry battery types within the same system,
      including the electronic circuitry using an initial test current at preferably between 300 to 500 mA for battery identification of the multi-chemistry primary and secondary dry-cell batteries.

6. Multi-chemistry battery charging system according to claim 1
   a. wherein said circuitry has multiple sub-circuits known as "channels" layout providing charging channels in a serial or parallel arrangement that function in unison yet independently to provide adjusted different charging currents using switching circuits to create charge current pulses at different frequencies providing the desired effects of slow, medium or fast charge rates suitable for recharging of the multi-chemistry primary and secondary dry-cell batteries within the same system.

7. Multi-chemistry battery charging system according to claim 1 a. wherein the charger is designed to accept DC and or AC power.

8. Multi-chemistry battery charging system of identifying and improved charging technique for primary and secondary dry-cell batteries such as Alkaline or Titanium, and Rechargeable Alkaline Manganese (RAM), NiCd or NiMH including the steps of:
   a. Providing a battery charger with microprocessor controlled circuitry for pulsed charging of the multi-chemistry primary and secondary dry-cell batteries,
   b. performing a series of self tests and initialization routines at power up of the battery charger to ensure the whole system is functioning correctly and send out appropriate signals to inform the user of its status;
   c. the circuitry of the battery charger constantly sending out electrical signals to all
      charging terminals to sense for the presence of batteries across all available battery bays in the battery charger;
   d. upon a battery being detected as connected to the charger,
      i. firstly measuring the initial voltage of the battery and comparing it with a preset range of values and deciding if the battery is a new or fully charged primary alkaline battery;
      ii. if it is then promptly indicating the battery is fully charged and stopping any further processing of the said battery; and
      iii. if the required condition is not met, then applying a relatively constant test current of the order between 300 to 500 mA to the battery for a preset period and monitoring the rate of voltage change of the said battery,
   Wherein the electronic circuitry can identify different primary and secondary batteries inserted into the charger to allow application of an inherently appropriate preferred charge current and voltage to safely and properly charge up the batteries.

9. Multi-chemistry battery charging method of identifying and improved charging technique according to claim 8
   d. wherein under relatively constant testing current, the voltage responses of most primary cells including a large percentage of rechargeable alkaline batteries and some old NiCd batteries quickly rises and meets a certain preset voltage level which allows automatic distinguishing of them as primary alkaline batteries; and
      i. these batteries would then be charged using an appropriate low to moderate charge current suitable for recharging of primary alkaline batteries until their preset full charged voltage is reached at a preferred 1.7V level
      ii. and appropriate charging channels would be switched off from further processing; and
      iii. suitable audio or visual signals generated to inform the user of the battery fully charged status.

10. Multi-chemistry battery charging method of identifying and improved charging technique of claim 9 wherein
    e. the voltage responses that overshoot the preset abnormal voltage range would render the batteries as faulty or no longer rechargeable
       i. and the appropriate charging channels would then be switched off from further processing
       ii. and suitable audio or visual signals generated to inform the user of the battery bad status.

11. Multi-chemistry battery charging method of identifying and improved charging technique according to claim 8, wherein
    f. for secondary rechargeable NiMH and NiCD batteries together with a certain percentage of alkaline and rechargeable alkaline batteries would have a voltage responses, from the applied relatively constant test current, rise relatively much slower and thereby automatically determine that these batteries regardless of their battery types all have in common very low internal resistances and
       i. are capable of accepting fast and safe pulse or constant charging current range of the order between 300 m to 500 mA;
       ii. whereby under this fast charging rate, rechargeable NiMH batteries' voltage responses would rise slowly to a preset full charged voltage range of 1.40 to 1.46V over time which varies depending on the capacity of the batteries under charge and
       iii. the battery voltage would then stay relatively constant at the above voltage range over a preset period of time and
       iv. when this condition is met it signals a full charged status for NiMH batteries and no further processing to the batteries are required.

12. Multi-chemistry battery charging method of identifying and improved charging technique according to claim 8 wherein
    g. with the same fast charge condition applied relatively constant test current, low-internal-resistance primary alkaline and rechargeable alkaline batteries as well as NiCd's voltage responses would rise much faster than those of NiMH described earlier and overshoot the NiMH full charged voltage range of 1.40 to 1.46V and continue to rise further and undertaking application of an inherently appropriate preferred charge current and voltage to safely and properly charge up the batteries
       i. by once this limit is passed, switching the appropriate charging channels to a slow to moderate charge current suitable for charging alkaline batteries and
       ii. the charging process continuing until the full charge 1.7V limit is reached.

13. Multi-chemistry battery charging method of identifying and improved charging technique according to claim 8 wherein during the whole charging process of all battery types, the controlling microprocessor(s) would sense and measure all battery voltage changes in one second increment steps and monitor for any abnormal charge responses and or charge termination criteria to occur so the charging process can be terminated promptly and all battery types are appropriately charged.

14. Multi-chemistry battery charging method of identifying and improved charging technique according to claim 8 wherein a combination of multiple charge termination and protection schemes are employed to ensure the highest safety level can be achieved that includes one or more of:
    a. Alkaline battery chargesafe protection,
       including the step of a gentle variable low current within a range of 30 mA up to 100 mA being used to charge and dynamically being monitored to ensure alkaline batteries being charged will not heat up and reach unsafe level;
    b. Faulty battery detection & rejection,
       including the built-in microprocessor running a series of test patterns (zero voltage for dead battery and over voltage above 1.8V for bad batteries) at the beginning and at the ending of the charging process on the batteries being charged and thereby filtering out bad and dead batteries;

c. Overcharge protection,
including each battery type being pre-assigned a maximum voltage level allowable that signal full charge condition reached: Alkaline, RAM and NiCd batteries are set at 1.7V max., NiMH is set at 1.48V max while Lithium Ion/Polymer single cell battery (3.6V/3.7V rated) is set at 4.1V max. and Lithium Ion/Polymer double cell battery (7.2V/7.4V rated) is set at 8.4V max. and when these limits for the corresponding battery types are reached, the microprocessor will terminate the charging process straight away;

d. Short circuit protection,
including the microprocessor being designed to sense short circuit conditions where an abnormal low-resistance such as a bad battery or a wire is connected between the positive and negative terminals and upon detection, the channel is turned off immediately;

e. Wrong polarity Protection,
including the micro processor sending a series of pulse currents to each channel and if the voltage response of the said channel is detected as negative voltage, this signals the battery is in reversed polarity and the charge process is terminated;

f. Negative delta voltage protection,
including while a battery is being charged, its voltage increases gradually and incrementally and this voltage is being monitored and allowed to continue to increase until it reaches the preset full voltage level according to its detected battery type and if this voltage hits a turning point and decreases noticeably then this drop means negative delta (change of) voltage has occurred and signals the battery no longer can absorb any more charge and then the charging process is terminated;

g. Zero delta voltage protection,
including while a battery is being charged, its voltage increases gradually and incrementally and this voltage is being monitored and allowed to continue to increase until it reaches the preset full voltage level according to its detected battery type and if this voltage hits a point and stays constant at this level without any further changes, this means zero delta voltage has occurred and signals the battery no longer can absorb any more charge then the charging process gets terminated and wherein zero delta voltage occurs for NiMH batteries at a voltage range of 1.44V to 1.48V and indicates it is fully charged;

h. Timer Protection,
including as a further safety backup measure, a pre-determined maximum time is set for the whole charging process to suit the battery type being charged, and once this time is reached, charging is terminated for the said battery;

i. Temperature protection via built-in cooling fan,
including whenever fast charging is employed to pump high current into the battery being charged, then the built-in fan is activated to draw out the heat generated within the internal circuitry of the charger and keep the temperature under a safe level;

j. Cooling fan failsafe protection,
Including ensuring that the built-in fan must work whenever fast charging is activated or the charger is overheated as components would become damaged; and wherein the built-in fan is continually being monitored by the microprocessor to ensure it is working when required and if fan failure is detected, the microprocessor would inhibit fast charging from taking place and only low to medium charging is allowed which do not overheat the charger.

* * * * *